United States Patent [19]

Vrisakis

[11] 3,996,399
[45] Dec. 7, 1976

[54] PROCESS FOR IMPROVING THE STABILITY AND SHAPING OF ANHYDROUS SODIUM METASILICATE, AND THE PRODUCTS, AND COMPOSITIONS CONTAINING SAME

[75] Inventor: Georges Vrisakis, Collonges-Au-Mon-D'Or, France

[73] Assignee: Societe Francaise des Silicates Speciauz "SIFRANCE", Courbevoie, France

[22] Filed: June 9, 1975

[21] Appl. No.: 584,754

[30] Foreign Application Priority Data

June 10, 1974 France .............................. 74.19932

[52] U.S. Cl. ............................. 427/215; 252/135; 252/136; 252/174; 252/385
[51] Int. Cl.² .......................................... C11D 3/08
[58] Field of Search .......... 252/135, 136, 174, 385; 427/215

[56] References Cited

UNITED STATES PATENTS

| | | | |
|---|---|---|---|
| 2,365,215 | 12/1944 | Rhodes .......................... | 252/135 X |
| 3,285,859 | 11/1966 | Jelen .............................. | 252/135 X |
| 3,630,928 | 12/1971 | Fuchs ............................. | 252/135 |
| 3,783,008 | 1/1974 | Weldes et al. ................. | 252/135 X |
| 3,819,526 | 6/1974 | Pierce et al. ................... | 252/135 |

*Primary Examiner*—Harris A. Pitlick
*Attorney, Agent, or Firm*—McDougall, Hersh & Scott

[57] ABSTRACT

The invention concerns a process for improving the stability and form of substantially anhydrous sodium metasilicate, and the compositions containing same, and the resulting products. According to the invention, sodium metasilicate is treated with a phosphoric compound. The present invention is used in particular for detergent compositions.

7 Claims, No Drawings

PROCESS FOR IMPROVING THE STABILITY AND SHAPING OF ANHYDROUS SODIUM METASILICATE, AND THE PRODUCTS, AND COMPOSITIONS CONTAINING SAME

The present invention concerns a process for improving the stability and shaping of anhydrous sodium metasilicate, and of the compositions containing anhydrous sodium metasilicate. The invention also relates to the resulting products.

Sodium metasiliate is a product which is in current use and which is extensively used in detergent compositions to which it imparts the required alkalinity, while presenting a lower degree of aggressiveness than other alkaline salts; in spite of its alkalinity, it is substantially non-corrosive in respect of glass and light metals such as aluminum.

Moreover, it has the advantage of having attractive detergent properties, such as an emulsifying action and an anti-redeposition action.

Accordingly, sodium metasilicate is frequently used in detergent compositions intended for washing tableware. Such detergent compositions generally comprise non-ionic surface active agents which make it possible to reduce the surface tension of the wash water containing the detergent, and thus more readily to emulsify grease.

The surface active agents which are usually employed include the products resulting from the condensation of ethylene oxide on a polypropylene glycol, or ethylene oxide on alkylphenols.

Unfortunately, the compositions resulting from the mixture of these substances and anhydrous sodium metasilicate are not stable.

In particular, discolorations are observed after a certain storage period, together with the development of off odors or scents, in particular on an aldehyde base.

It is also noted that the clouding temperature varies in dependence on time. The term "clouding temperature" is used to denote the temperature above which the aqueous solution of the composition becomes heterogenous due to the formation of two liquid phases, this variation causing variations in the relationship between the hydrophilic-lipophilic properties of the surface active agent.

It has been found, and this is the subject of the present invention, that it was possible to remedy these disadvantages by treating a sodium metazilicate containing less than 10% by weight water with at least one phosphoric compound comprising a phosphoric acid or a mineral derivative of a phosphoric acid.

Hereinafter, for the sake of convenience, the expression anhydrous sodium metasilicate or metasilicate will be used instead of sodium metasilicate containing less than 10% by weight of water.

Such a metasilicate can be easily produced by fusing sand and sodium carbonate in a furnace at a temperature of from 1100° to 1200° C, followed by crushing, cooling and screening.

In a preferred embodiment of the present invention, the phosphoric compound used comprises monosodium phosphate.

In a mode which is also of advantage, the process of the invention is performed by spraying an aqueous solution and at least one phosphoric compound onto the metasilicate.

However, it is also possible to use other modes of operation, such as making a mixture of metasilicate, in powder form, with said phosphoric compound or a compound containing one or more phosphoric compounds according to the invention.

However, as already stated above, a particularly attractive and unexpected action results from the application of the metasilicate thus treated, to a mixture of the cleaning or detergent composition type containing a non-ionic surface active agent, since, in this case, stabilization of the clouding temperature, inhibition of discoloration and inhibition of the degradation scents are observed.

In a simple mode, the treated metasilicate and the surface active agent can be dispersed in the mixture.

In one embodiment of the invention, the metasilicate is treated with from 2 to 10 cm$^3$ of a saturated solution of at least one phosphoric derivative per 100 g of metasilicate.

The non-ionic surface active agent used can in particular comprise a fatty amine oxide, an alkylolamide, a product of condensation of ethyleneoxide with a long-chain phenol or alcohol, a fatty acid, an amine or an amide.

In a simple and practical mode, it is possible to use an ethoxylated derivative, such as in particular that resulting from the condensation of ethyloxide on a polypropylene glycol, or ethyleneoxide on an alkylphenol. In an advantageous embodiment, this compound comprises ethoxylated nonylphenol having 9 ethyleneoxide moles for 1 mole of nonylphenol.

The present invention makes it possible to produce a novel substance which is part of the invention, and which can be applied in particular to detergent compositions containing metasilicate and a non-ionic surface active agent.

In an advantageous form, such a composition contains by weight from 20% to 60% of metasilicate, from 0.2% to 2% of monosodium phosphate and from 1% to 5% of a non-ionic surface active agent.

The present invention will be more readily understood by reference to the following examples:

EXAMPLE 1

The aim of this example is to indicate the improvement obtained in treating an anhydrous metasilicate with a phosphoric derivative, in accordance with the invention.

The sodium metasilicate is prepared, as set out above, by fusing sand and sodium carbonate in a furnace at a temperature of from 11° to 1200° C. The resulting product is then crushed, cooled and sieved.

1 kg of granulated anhydrous metasilicate is then treated with 30 g of an aqueous solution of monosodium phosphate containing 40% of dry extract.

Two tests are then carried out, one being a test in respect of resistance to caking and the other being a test in respect of the formation of dust, on a reference specimen which therefore comprises untreated metasilicate, on the one hand, and on a specimen which has not been treated as described above, on the other hand.

The test in respect of resistance to caking comprises subjecting the product to alternating humidity and high temperature conditions, then subjecting the resulting cake to a controlled mechanical action which destroys the cake to a greater or lesser extent, depending on the tendency of the product to cake.

The mode of operation is as follows:

20 g of the product to be tested is weighed out, and is left in a capsule for 24 hours at a relative humidity of 75% at 40° C.

the product to be tested is then left for 6 hours at a relative humidity of 20% at 40° C.

the product is then left in ambient air.

the product is sieved for one mintue on a 2 mm sieve, and the amount $P_1$ which passes through and the residue $P_2$ which is not passed are weighed.

The resistance to caking is expressed by the following relationship:

$$R = (P_1/P_1 + P_2) \times 100$$

The test in respect of the formation of dust comprises measuring the amount of dust particles (particles of the order of a micron which are retained along the walls of a PVC tube when the product falls gravitationally within the tube).

For this purpose, use is made of a PVC tube which is 1 m in length and which has an internal diameter of 25 mm. At its upper end the tube is provided with a vibrator charging funnel.

100 g of the product to be tested is introduced into the funnel and the rate of vibration of the funnel is controlled so as to provide a feed rate of 30 seconds to introduce the material.

The dust particles adhering to the walls of the tube are then recovered by means of 40 cm³ of water, and the solution is measured with N/20 $H_2SO_4$.

The following table gives the results of these two tests with reference to metasilicate and on a metasilicate which has been treated in accordance with the invention:

| Test | Resistance to caking | Formation of dust |
|---|---|---|
| Reference | 5 | 30 |
| & Metasilicate according to the invention | 25 | 3 |

It can be seen from this that the resistance to the formation of lumps is substantially increased whereas the tendency to the formation of dust is reduced by the practice of this invention, which points towards a marked improvement in form.

EXAMPLE 2

The aim of this example is to indicate the advantages of using a metasilicate which has been treated in accordance with the invention, in a non-ionic surface active agent — metasilicate mixture.

In this example, preparation of the sodium metasilicate and its treatment are identical to those of the preceding example.

Improvement in Coloring 98 g of anhydrous metasilicate and 2 g of a surface active agent comprising ethoxylated nonylphenol having 9 moles of ethyleneoxide for 1 mole of nonylphenol are mixed. This mixture is then stored in a closed container, in a drying oven at 50° C.

Coloring after 24 hours, 48 hours, 96 hours and 144 hours are observed.

The following results are obtained:

| Time | 24 hours | 48 hours | 96 hours | 144 hours |
|---|---|---|---|---|
| Reference Metasilicate | severe coloring | severe coloring | severe coloring | severe coloring |
| according to the invention | no coloring | no coloring | no coloring | no coloring |

The reference is produced by mixing the same surface active agent with a metasilicate which has not been treated by the process of the invention, in the same proportions.

Improvement in Clouding Temperature

A mixture is made of 96 g of metasilicate and 4 g of the same surface active agent is above.

The mixture is stored under the same conditions as above, namely in a drying oven at a temperature of 50° C.

In order to determine the clouding temperature, 10 g of the mixture is taken off, and dissolved in 990 g of water in a beaker. The beaker is placed on a hot plate, with magnetic stirring. Stirring is at a maximum during dissolution, but is then reduced to about 150 rpm.

The beaker is covered with a clock glass with a perforation so as to permit a thermometer to be immersed in the solution contained in the beaker.

The temperature of the clouding point is taken at the time at which it is no longer possible to see the graduations of the immersed part of the thermometer.

The results obtained are given in the following table:

| Time in hours Temperature ° C | 0 | 24 hours | 48 hours | 72 hours | 144 hours |
|---|---|---|---|---|---|
| Reference | 32 | 29 | 26 | 24.5 | 23.5 |
| Product of the invention | 32.5 | 32 | 32 | 32 | 32 |

This table clearly shows the stabilizing action of the process according to the present invention.

Test in Respect of Stability of Scent 42 g of metasilicate, 0.3 g of a scent essentially comprising citraldehyde and 2.5 g of the same surface active agent as above, are mixed in a beaker.

The mixture is stored in a closed container at a temperature of 20° C.

After 4 hours, it is found that the odor of the product according to the invention has not varied, whereas that of the reference has been substantially changed.

EXAMPLE 3

This example is identical to that above, except that 40 g of monosodium phosphate, instead of 30 g, is added to one kilogram of anhydrous metasilicate.

The results are comparable with those of the preceding example.

EXAMPLE 4

In this example, the anhydrous metasilicate is not treated by spraying to coat the metasilicate with an aqueous solution of monosodium phosphate, but by mixing 50 g of monosodium phosphate in powder form with a kilogram of sodium metasilicate.

The results of the coloring test are as follows:

| Time | 24 hours | 48 hours | 96 hours | 144 hours |
|---|---|---|---|---|
| Reference | severe coloring | severe coloring | severe coloring | severe coloring |
| Product of the invention | no coloring | slight coloring | slight coloring | slight coloring |

The results obtained are slightly inferior to those achieved by the mode of operation set out in the preceding examples, but nevertheless are greatly superior to those attained with the reference.

EXAMPLE 5

A mixture is made of 50 g of monosodium phosphate in powder form with 1 kilogram of metasilicate, in the same manner as Example 4, except that the surface active agent used is a polycondensate of ethyleneoxide and propylene oxide on an alcohol which is commercially available under the name Plurafac RA 43, which may be represented by the formula

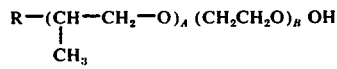

in which R is a $C_{12}$ alcohol, A is 5 and B is 6.

The coloring test is carried out on a mixture containing 96 g of metasilicate treated as described above, and 4 g of surface active agent.

The following results are obtained:

| Time | 24 hours | 96 hours | 144 hours |
|---|---|---|---|
| Reference | slight yellow coloring | medium coloring | severe coloring |
| Metasilicate according to the invention | no coloring | no coloring | no coloring |

The examples clearly show the attraction of the present invention, which provides a marked improvement in stability and shaping of anhydrous sodium metasilicate, either alone or in compositions containing it.

I claim:
1. A process for improving the stability and minimizing agglomeration and disintegration of sodium metasilicate particles consisting essentially of providing a sodium metasilicate having less than 10% by weight water, treating the sodium metasilcate particles with a monosodium phosphate by mixing the the sodium metasilicate particles with monosodium phosphate in powder form or by coating the sodium metasilicate particles with an aqueous solution of monosodium phosphate, in the ratio of 20–60 parts by weight sodium metasilicate to 0.2 to 2 parts by weight monosodium phosphate.

2. A process according to claim 1 in which the sodium metasilicate is coated with an aqueous solution of the monosodium phosphate.

3. A process according to claim 2 in which the sodium metasilicate is coated by spraying with the aqueous solution.

4. A process according to claim 1 which includes mixing a non-ionic surface active agent with the treated sodium metasilicate wherein the non-ionic surface active agent is present in an amount within the range of 1-5% by weight.

5. A process according to claim 4, in which the non-ionic surface active agent is an ethoxylated derivative.

6. A process according to claim 5, in which the ethoxylated derivative is ethoxylated nonylphenol.

7. A novel product comprising sodium metasilicate which has been coated or mixed with monosodium phosphate by the process according to claim 1.

* * * * *